June 25, 1963   W. D. ASHCRAFT   3,095,541
DETECTOR HAVING DESIRED WAVEFORM DETECTED WITHIN SPECIFIED
AMPLITUDE RANGE AND AS FUNCTION OF TIME
Filed Sept. 22, 1959   7 Sheets-Sheet 1
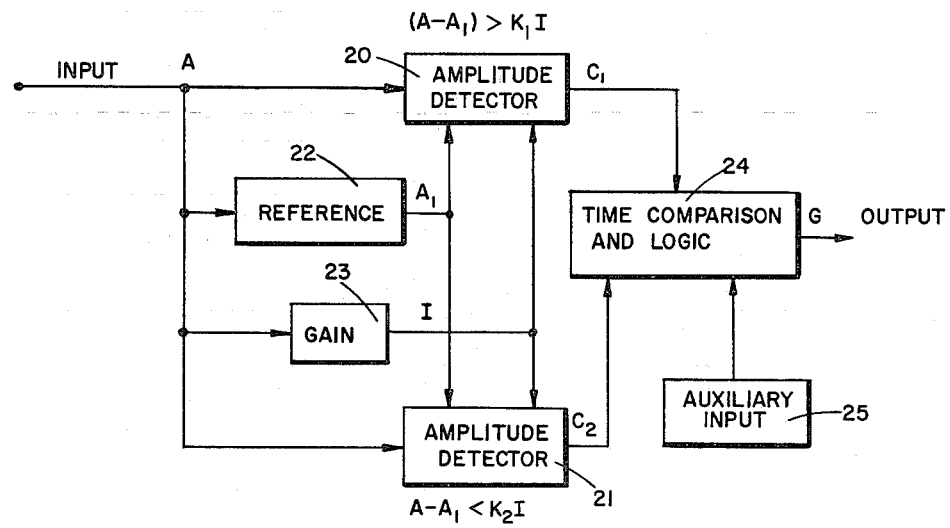
FIG. Ib
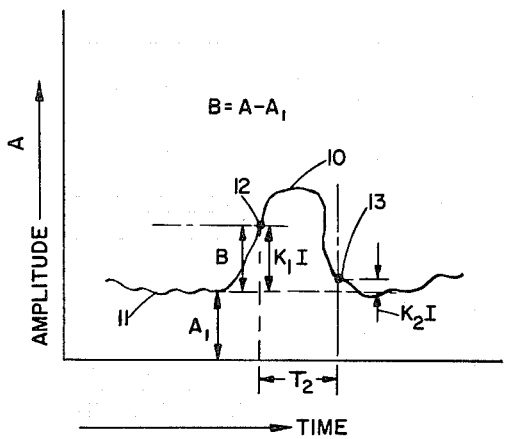
FIG. Ia
INVENTOR.
WILLIAM D. ASHCRAFT
BY *Allan Rothenberg*
ATTORNEY INVENTOR.
WILLIAM D. ASHCRAFT
BY Allan Rothenberg
ATTORNEY

INVENTOR.
WILLIAM D. ASHCRAFT

BY Allan Rothenberg

ATTORNEY

INVENTOR.
WILLIAM D. ASHCRAFT
BY Allan Rothenberg
ATTORNEY

INVENTOR.
WILLIAM D. ASHCRAFT
BY
Allan Rothenberg
ATTORNEY

United States Patent Office 3,095,541
Patented June 25, 1963

3,095,541
DETECTOR HAVING DESIRED WAVEFORM
DETECTED WITHIN SPECIFIED AMPLI-
TUDE RANGE AND AS FUNCTION OF TIME
William D. Ashcraft, Long Beach, Calif., assignor to
North American Aviation, Inc.
Filed Sept. 22, 1959, Ser. No. 841,550
11 Claims. (Cl. 328—115)

This invention relates to the detection of waveforms and particularly concerns apparatus for detection of an information bearing waveform in the presence of noise or spurious waveforms.

The signal from the transducing or sensing portion of a system such as a radar, sonar or optical system contains several time dependent pulse waveforms, each of which waveforms signifies a different target or signifies noise. Detection of a particular one of these waveforms and rejection of the remaining ones is desired in order to manifest the presence of a particular type of a target. The principal object of the present invention is the detection of the selected one of such waveforms. The principles of the invention are readily applicable to many different types of sensing systems whether radar, sonar or the like. However, in order to clearly illustrate the use and operation of the invention, it will be specifically described in connection with an optical system which is exemplary of but one of several systems which may advantageously utilize the invention.

One such optical system is the commonly utilized star tracking equipment wherein a telescope is pointed at a selected star for the purpose of detecting the presence of the star and the direction thereof relative to the optical axis of the telescope. The equipment includes a scanning mechanism for scanning a selected field of view, a phototube for transducing an optical signal to an electrical signal and a pulse detector for providing a signal indicating that the light of the star has been received by the phototube. The described embodiment of the present invention provides improvement of the pulse detector of the system.

The phototube of the optical system will react to both sky light and starlight. Thus, the detector must separate the two so that the position of the star can be deduced. In daylight star tracking, the image of the star tracker telescope comprises an image of a relative small patch of bright blue sky with a star therein. The problem of separating the star from the sky background is largely a signal-to-noise ratio problem. The signal is the starlight, while the noise is the skylight plus any other source of detector current. The scanner is utilized to reduce the noise or skylight signal. It operates by moving a small aperture over the field of view of the telescope so that only a small amount of skylight is received at any instant. When the scanning aperture coincides with the star position, there is an increase in light to the phototube and a current pulse therefrom which is generally filtered and then fed to the detector.

The output of the phototube will have a number of spurious waveforms in addition to the pulse caused by the starlight. These spurious waveforms include a large constant current caused by the daylight sky, periodic noise and random noise. Periodic noise is generally caused by the sky gradient (due to variation in brightness of the sky in accordance with distance from the sun, for example), optical and mechanical imperfections in the equipment and polarization of the sky light. Shot noise and secondary emission noise in the phototube and amplifier tubes are random noises. Other random noises originating external to the system are due to clouds, water vapor, dust and smoke in the atmosphere. Thus, it will be seen that the input signal from the detector comprises an information bearing waveform produced by the light from the star to be tracked and simultaneously includes a number of spurious waveforms which vary in unknown manner and tend to mask the information signal.

Filters have been utilized and are helpful to some extent in eliminating certain spurious waveforms of known characteristics. Even with the use of such filters, prior methods of determining the presence of the desired waveform include the use of a human operator to observe an oscilloscope display or the use of a trigger circuit actuated by a pulse of predetermined magnitude. The use of a human operator is obviously a disadvantage of the former method. In the latter method, all waveforms of magnitude greater than the predetermined level are detected even though they may be spurious waveforms.

Accordingly, an object of this invention is to enable improved detection of a desired waveform in the presence of noise. To this end the present invention utilizes logical correlation techniques to detect a selected waveform and reject all others. That is, a set of conditions uniquely characteristic of the desired waveform is predetermined as by analysis of a typical input signal. The individual input signal is then analyzed to ascertain the occurrence of a set of conditions corresponding to the predetermined set. When the two sets of conditions match, the specified waveform exists.

Fundamentally, the conditions utilized are amplitudes of different, discrete portions of the input signal and the chronological relations between such different portions of selected amplitude or between the cyclic recurrence of the same portions. For example, a first condition is considered to be matched if the amplitude of the input exceeds a reference amplitude by a selected value. A second condition is considered to be matched if the amplitude of the input is less than a selected fraction of the reference. Both the reference amplitude and the selected difference between reference and input, in a specific embodiment, are made dependent upon characteristics of the input signal itself. Now if the duration or time interval between the recurrence of a selected condition or the successive occurrence of different conditions is, in the alternative, more than, less than, or equal to a selected interval, there will be produced an output signal manifesting the existence of the desired information bearing signal.

In the disclosed embodiment, the concept of the invention is mechanized by the use of one or more amplitude quantizers which produce signals indicating when the input signal is above or below a reference level by a certain amount. When a certain number of such signals from the amplitude quantizer occur within a selected time interval or are not repeated more frequently than a selected repetition rate, the presence of the desired waveform is indicated. The reference level is some function of the input signal such as the value of the input when its first time derivative (slope) changes from zero to positive. The several relations between the reference amplitude and the input signal amplitude (occurring at time specified portions of the input) also are functions of the input signal such as the R.M.S. value of noise.

An object of this invention is the measurement of the amplitude time pattern of an input waveform.

A further object of the invention is the comparison of the amplitude time pattern of an input signal with a predetermined pattern.

Another object of the invention is the detection of a particular input waveform by measuring the amplitude of different portions of the waveform and measuring the chronological relation of the occurrence of selected amplitudes.

Still another object of the invention is the measurement of the amplitude of the input signal relative to a reference which is a function of such input signal.

Another object of the invention is the provision of a pulse detector which effectively rejects noise.

These and other objects of the invention will become apparent from the following description taken in connection with the accompanying drawings in which:

FIG. 1a illustrates an exemplary input signal;

FIG. 1b is a block diagram illustrating the amplitude time pattern comparison provided by the present invention;

Figure 2:
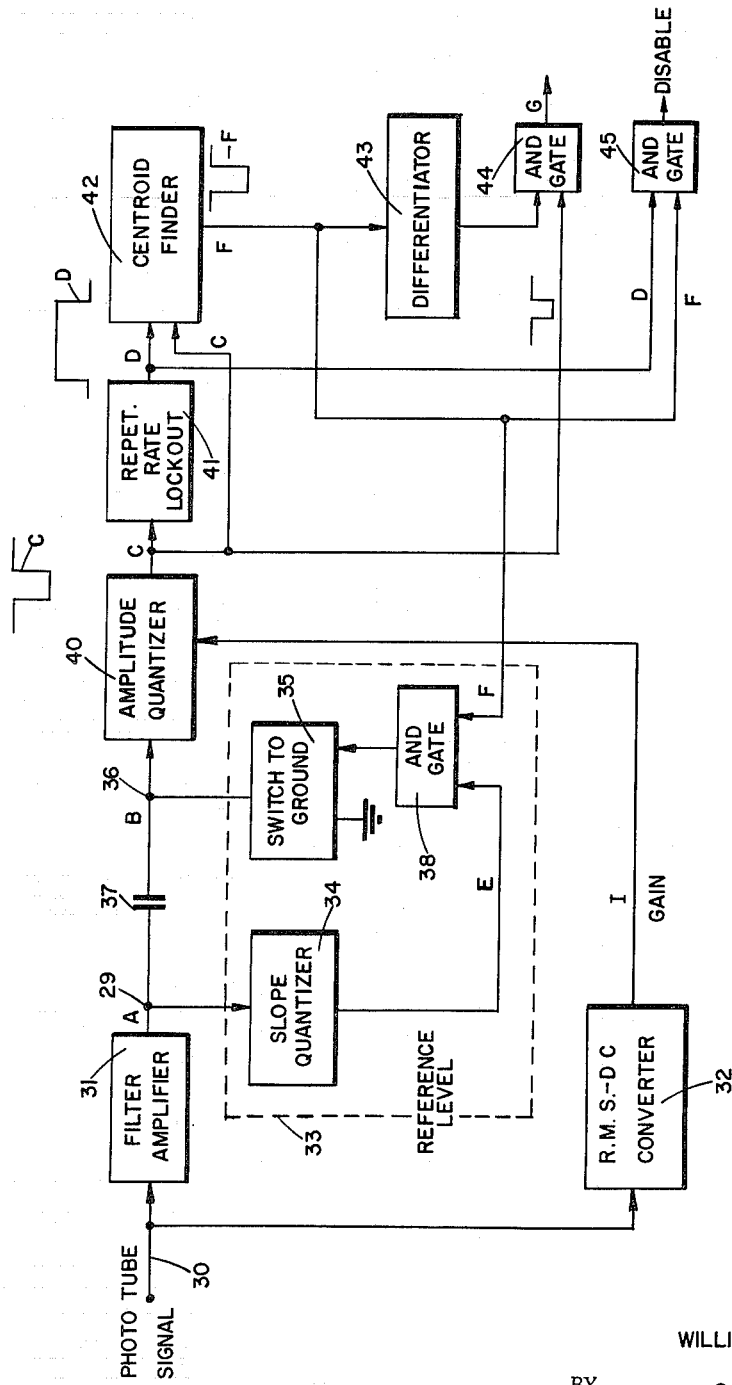
FIG. 2 is a block diagram of a preferred embodiment of the principles of the invention as specifically mechanized for use in an optical system.
Figure 3:
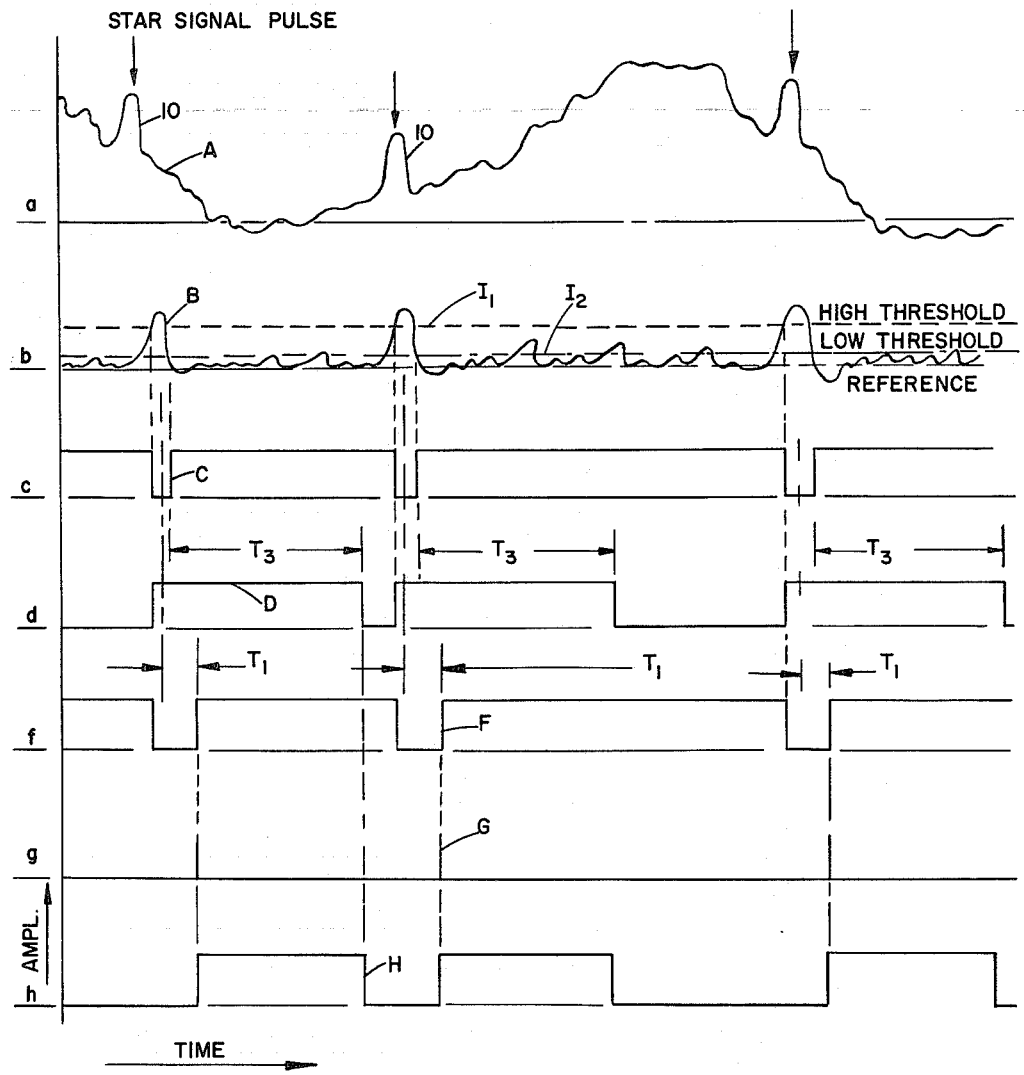
Figure 4:
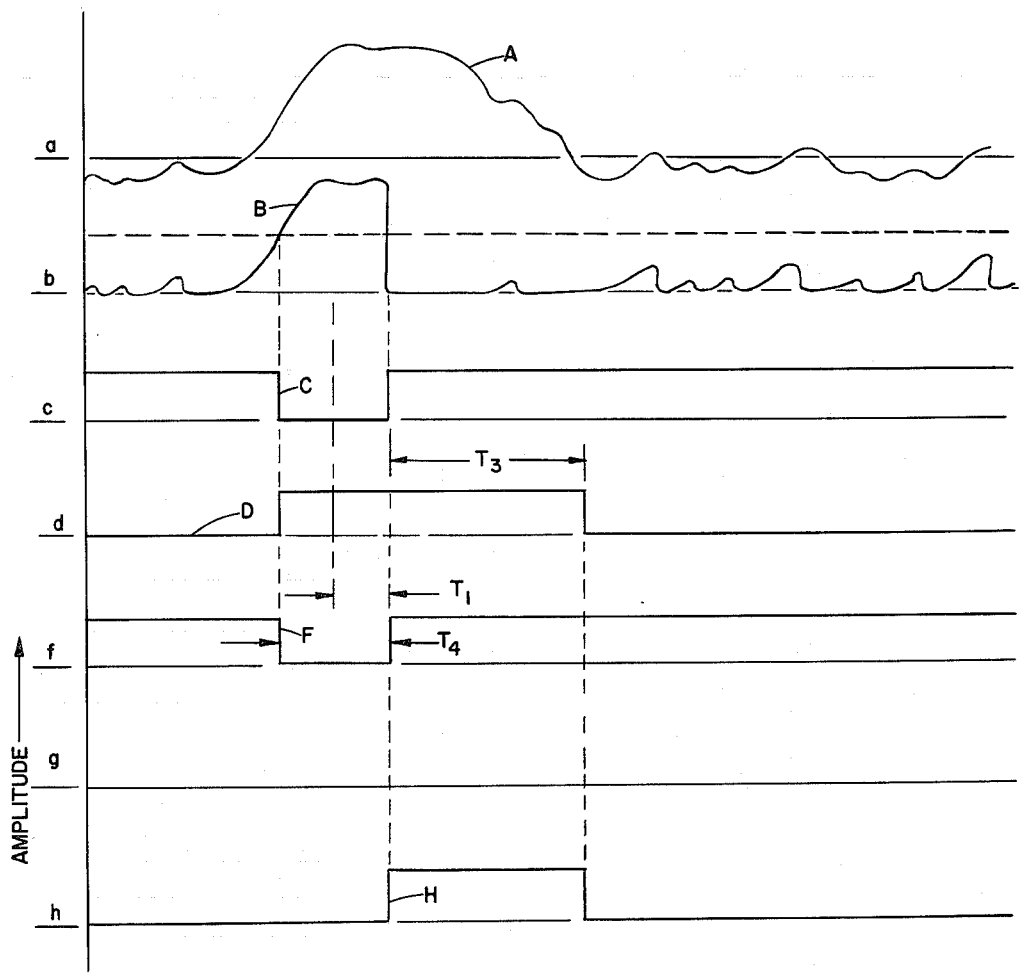
Figure 5:
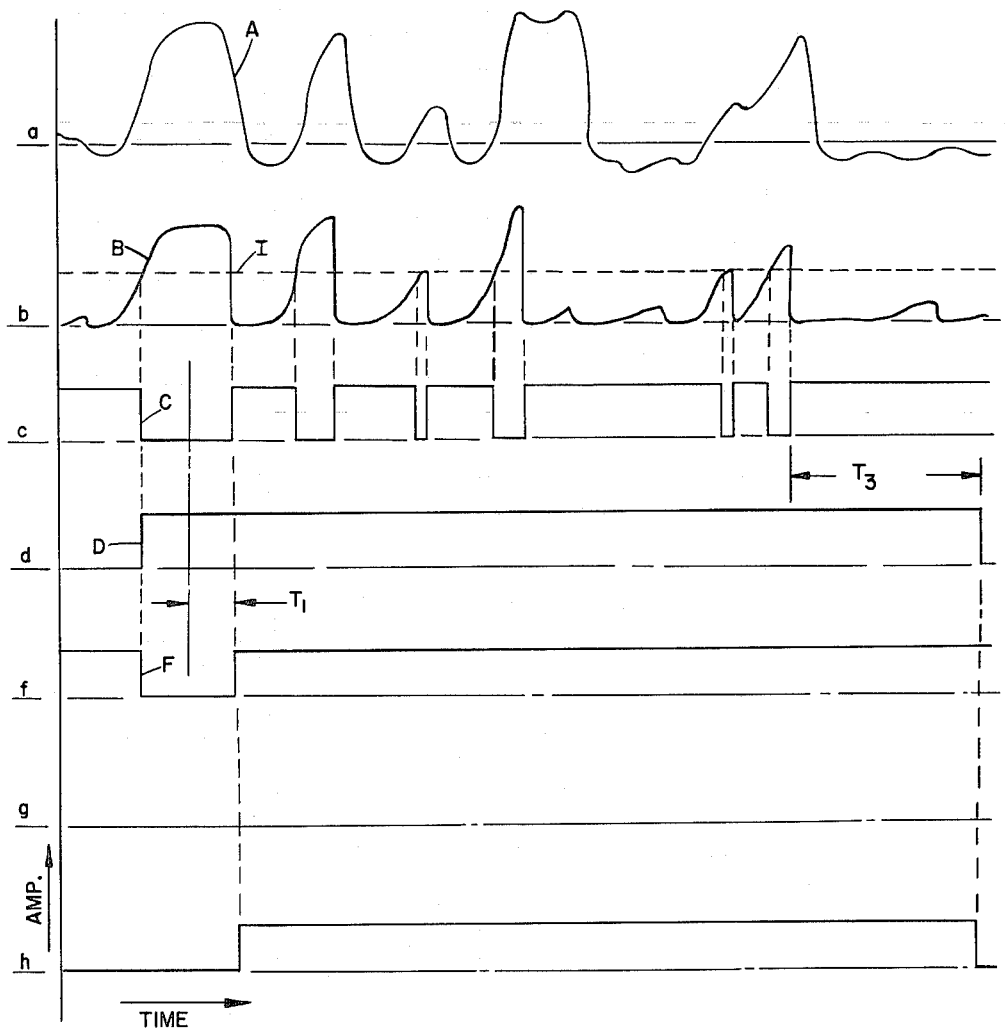
Figure 8:
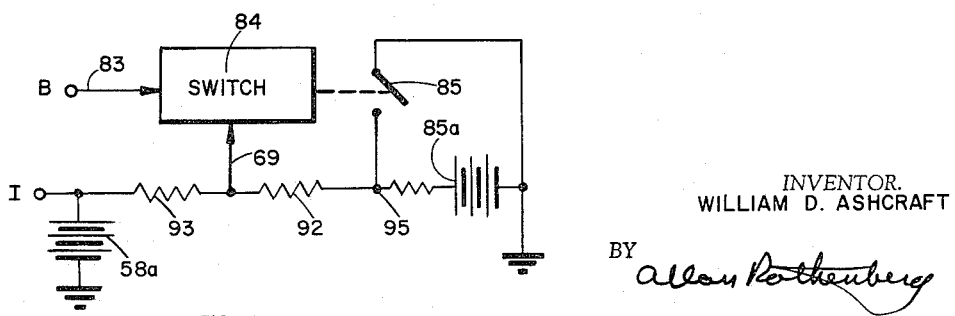
Figure 6:
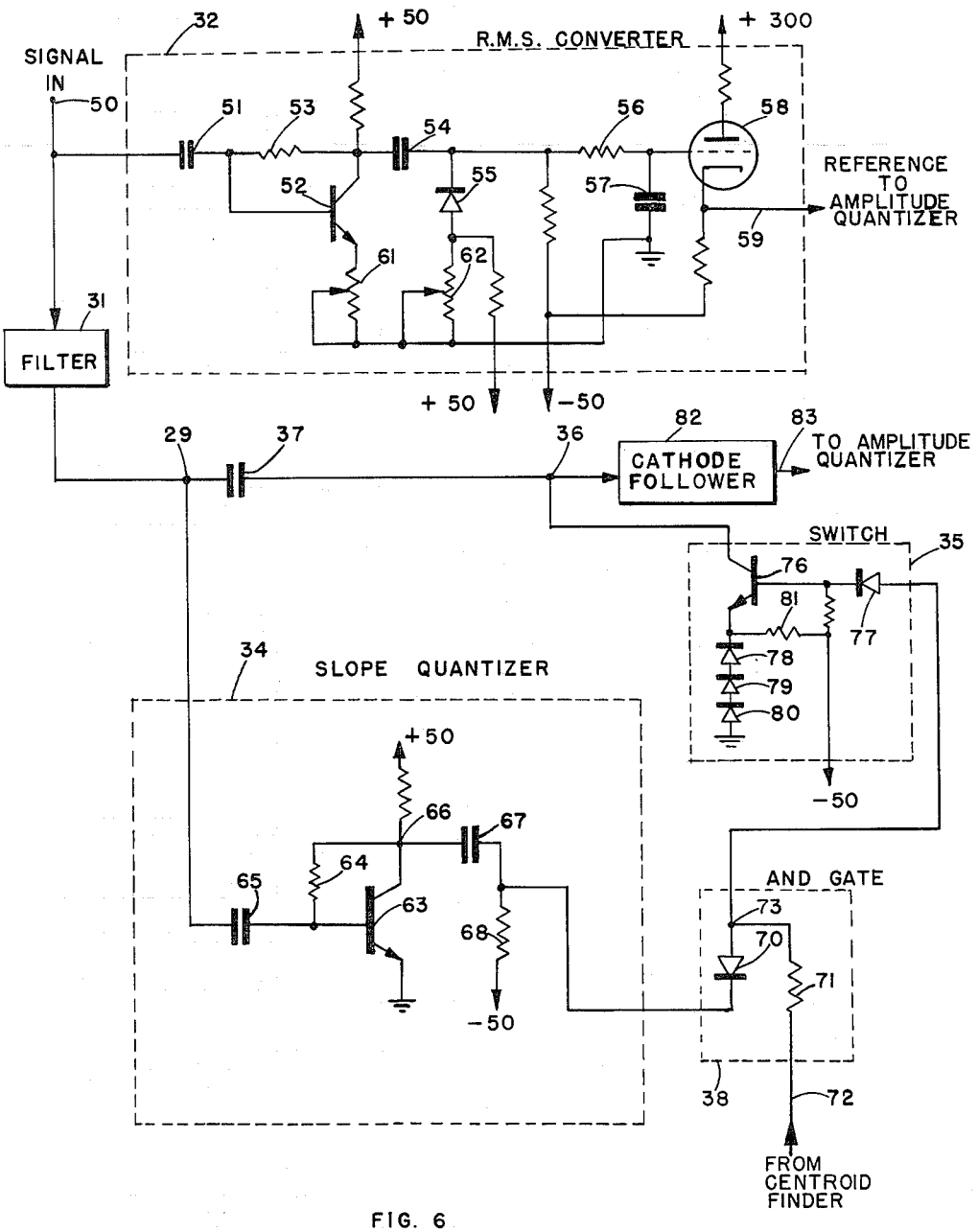
Figure 7:
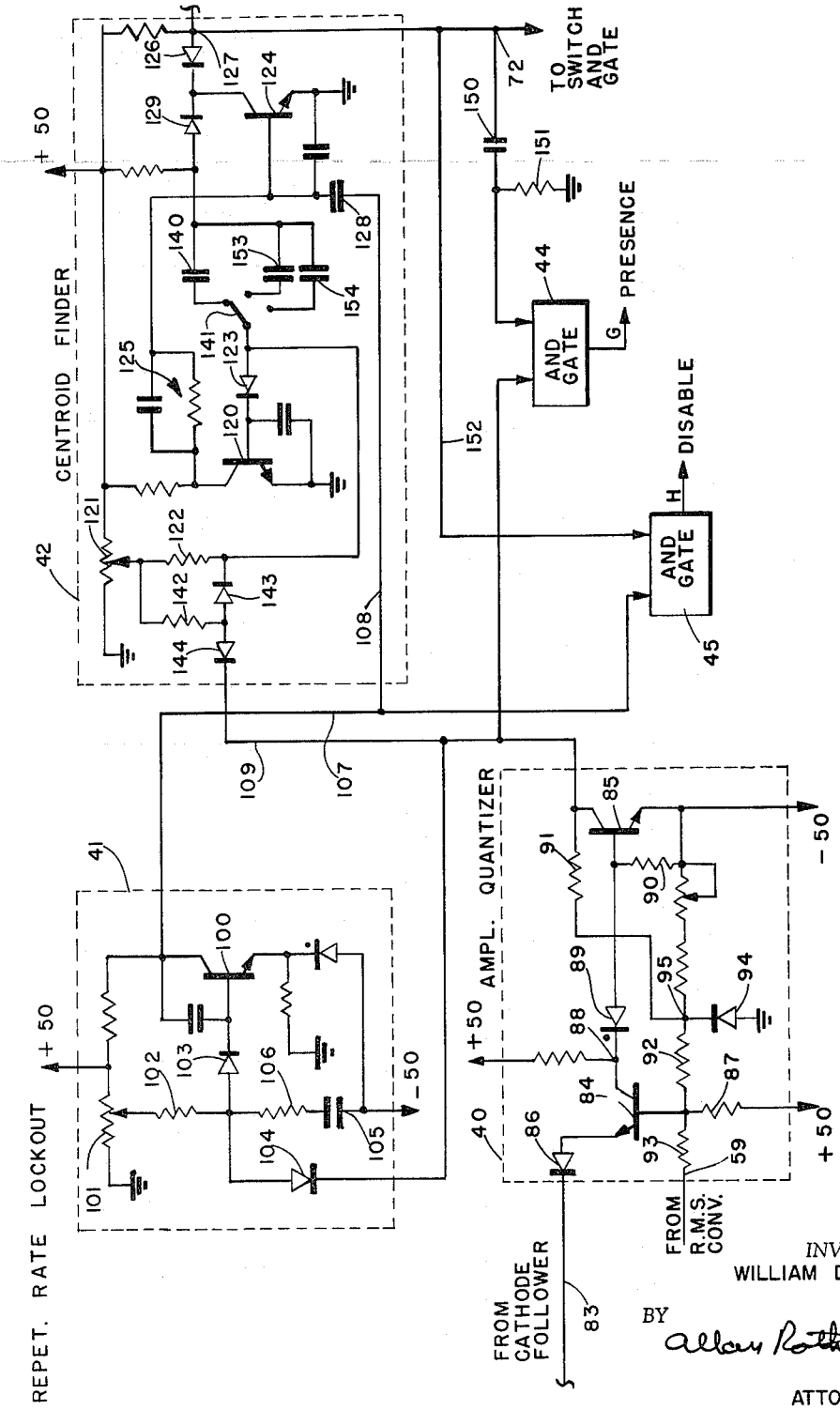

FIG. 3 comprises a synchrograph illustrating the operation of the embodiment of FIG. 2 for certain conditions of the input signal;

FIGS. 4 and 5 comprise synchrographs illustrating the operation of the embodiment of FIG. 2 for other conditions of the input signal;

FIGS. 6 and 7 illustrate the detailed circuitry of the embodiment of FIG. 2, and FIG. 8 is a functional diagram of the amplitude quantizer of FIG. 7.

In the drawings, like reference characters refer to like parts.

As illustrated in FIG. 1a, an input signal to the detector of this invention may comprise an information bearing pulse 10 superimposed upon a noise level or spurious waveforms 11. From a study and previous inspection of this waveform, it is determined that the pulse 10 is the desired information bearing waveform when the amplitude of its leading edge exceeds a reference level $A_1$ by a predetermined amount $K_1I$ where $K_1$ is a constant and $I$ is a gain control factor. The amplitude $A_1$ is the reference level and may be dependent upon some characteristics of signal input A. Thus, the reference level $A_1$ may be average signal voltage, positive peak signal voltage, negative peak signal voltage, signal voltage time derivative or signal voltage at each instant its time derivative is a specified value. In the described embodiment, the reference level $A_1$ is chosen as the amplitude of the input signal A at the point thereof where its first time derivative changes from negative to positive.

The relation $K_1I$ between the instantaneous signal amplitude and the reference value is termed a gain factor. The gain control factor $I$ may be proportional to the average signal voltage, the R.M.S. signal voltage, the R.M.S. value of random noise present in the signal voltage or some parameter in associated equipment. In the described embodiment, the value of $I$ is determined as the R.M.S. value of Gaussian noise of the input signal A.

In analysis of the input signal provided by a specific system for which the invention is to be used, it is observed that the signal increment $B = A - A_1$ (the instantaneous value of the input signal with respect to the reference $A_1$) exceeds a quantity $K_1I$ at the leading edge of the desired pulse. Similarly, the signal increment B at the trailing edge of the desired pulse is less than the value $K_2I$ where $K_2$ is a predetermined constant. That is, observation of the desired input signal waveform 10 has shown that it must have a certain magnitude of leading edge and thereafter must drop below a second predetermined value. These conditions are observed to occur, for example, within a predetermined time interval such as $T_2$ whereby it is known that the maximum width of the desired pulse 10 is not greater than $T_2$. Thus, the operation of the invention is such as to produce a first signal at point 12 of the input signal A, where A exceeds the reference level $A_1$ by an amount equal to $K_1I$, and to produce a second signal at point 13 of the input signal A when the value of A relative to the reference $A_1$ is less than a second selected value $K_2I$. If these first and second signals occur within a time equal to or less than $T_2$, the pulse 10 is the specified pulse. Occurrence of other additional conditions may also be specified.

As illustrated in FIG. 1b, the input signal A is fed to first and second amplitude detectors or amplitude quantizers 20 and 21 which produce respectively signals $C_1$ and signals $C_2$ upon the occurrence of the amplitude condition peculiar to the individual detector. A reference signal generator 22, receiving the input signal A as an input thereto, provides to each amplitude detector a reference signal $A_1$. A gain controller 23 having the input signal A applied as an input thereto provides to each amplitude detector the gain factor $I$. The constants $K_1$ and $K_2$ are provided by the respective detectors 20 and 21. Thus, a signal $C_1$ from detector 20 will be provided for point 12 of the waveform of FIG. 1a at which the difference quantity B exceeds the value $K_1I$. Similarly a signal $C_2$ will be provided at the output of detector 21 at the point 13 of the waveform of FIG. 1a when the difference quantity B is less than the value $K_2I$. The signals $C_1$ and $C_2$ are fed to a time comparison and logical circuit 24 which compares the relative timing of the signals $C_1$ and $C_2$ to produce an output signal G if the two signals occur within a predetermined time interval. The circuit 24 may also contain logical circuitry for disabling its output G as for example when the signal $C_1$ is repeated within some selected time interval. The latter operation is utilized in a situation wherein the pulse 10 is cyclically repeated at scanning frequency, for example. With such an arrangement it will be readily appreciated that the leading edge of the desired information pulse will occur but once each cycle.

An auxiliary input 25 to the timing and logical circuit 24 may control the predetermined time interval within which signals $C_1$ and $C_2$ must occur or may control the period in which successive signals $C_1$ cannot occur. This auxiliary input 25 may be operated manually or otherwise for different modes of operation of the equipment such as different scanning frequencies, different doppler radar difference frequencies, or different vehicle velocities and the like. Thus, the apparatus of FIG. 1b provides first and second signals respectively indicative of first and second relations between the input and reference signals and timing means responsive to the detecting means for indicating a selected chronological relation between such first and second signals. While but two amplitude detectors 20 and 21 are illustrated, it will be readily appreciated that additional detectors for detecting additional relations between the input and reference signals may be utilized for the detection of more complex signals while the timing and logical circuitry may additionally take into account desired chronological relation between one or more of each of the several detected amplitudes.

Analysis of a particular optical tracking system upon which the described embodiment of the present invention has been successfully utilized has revealed that the input signal to the detector contains the following five components:

(1) The star signal pulse, which is approximated by a one-minus-cosine pulse waveform.

(2) Gaussianly distributed random noise caused by phototube shot noise.

(3) Random low frequency signals caused by water vapor and dust in the atmosphere which signals often appear together with the start signal pulse.

(4) Long duration pulse waveforms caused by clouds or other opaque material passing through the field of view and which obliterate the star signal pulse.

(5) High repetition rate pulse waveforms such as occur when clouds or smoke pass through the field of view and which obliterate the star signal pulse.

FIG. 3a illustrates the input waveform A when comprising the sum of the first three components listed above. This waveform is a typical waveform for which the specifically illustrated embodiment of the pulse shape correlator or detector of the present invention was developed.

FIGS. 4a and 5a illustrate the fourth and fifth components listed above, the long duration waveforms and high repetition rate waveforms. These are typical of those which the present invention will reject.

Upon visual inspection of the waveform A of FIG. 3a, the star signal pulse 10 can be distinguished with ease. The described mechanization of electronic equipment for automatically detecting this pulse establishes certain conditions or criteria unique to the signal pulse 10 and compares such predetermined conditions with the existence or absence of corresponding conditions in the actual input signal A. The operation is as follows:

There is established as a reference each point at which the waveform has a zero first derivative and a positive second derivative. Above this reference point, high and low threshold value are established as proportional to the R.M.S. value of the existing Gaussian random noise. If at any time the input waveform has an amplitude relative to the most recently established reference point which exceeds the high threshold value, a timing interval is initiated having a duration $T_2$ slightly greater than the width of a typical star signal pulse. At the end of this interval, a new reference point is established. Now, if at the end of the waiting period or timing interval the input waveform lies below the low threshold value, that is, if its amplitude relative to the previously established reference point is less than the low threshold value, the input waveform contains the star signal pulse and a signal indicative of this effect is produced. The circuitry, however, will ignore a waveform which exceeds the high threshold if it occurs more quickly after a previous waveform has exceeded the high threshold than the minimum period between two star signal pulses. In other words, if the high threshold is exceeded twice within an interval less than the period of the scanning frequency, the second waveform which exceeds the high threshold cannot be a star pulse.

The above-described operation is mechanized by the apparatus illustrated in FIG. 2 which produces the waveforms indicative of its operation as illustrated in FIGS. 3, 4, and 5. The input signal from the phototube or phototube amplifier appears on the lead 30 and is fed through a filter 31, at the output of which appears the signal A. The phototube signal on lead 30 before filtering is fed to the gain controller 32 which produces the gain signal I as a direct-current voltage proportional to the R.M.S. value of Gaussian noise appearing at the input lead 30. The details of the filter 31 may vary to suit different applications and, in fact, for the purposes of the present invention the filter 31 may be entirely eliminated. It will readily be appreciated, however, that the use of a filter to eliminate certain high or low frequency noise components such as those due to mechanical factors of the scanning mechanism or the like may enhance the total operation of the system. Similarly, since the fundamental problem is a signal-to-noise ratio problem, the filter may be utilized to increase the ratio of peak star signal pulse amplitude to R.M.S. value of noise, as is well known to those skilled in the art.

The signal A is fed to a set of circuits within the dotted box 33 which controls the reference level with respect to which the amplitude of the signal is measured. The reference level control includes a slope quantizer 34, which in effect divides the signal slope into two regions, positive and negative. For positive slope, the output E of quantizer 34 is low while for negative slope the output E is high. It is to be understood that the occurrence and nonoccurrence of the several logical conditions are manifested throughout the described embodiment of the invention by true-false or logical one-zero signals wherein true or logical one is indicated by a relatively high level signal and false or logical zero is indicated by a relatively low level signal. The slope quantizer output E is fed to an And gate 38 which has an additional input F, to be described below, which is normally high. When the slope of the signal A is negative, the signal E is high and the And gate produces a high signal which is fed to a switching device 35. The switching device 35 is connected between point 36 and ground. When the input to the switch is high, the switch is closed to ground point 36. The switch is open when its input is low.

The above-described reference level circuitry cooperates in a novel manner with a memory comprising capacitor 37 to produce at point 36 the signal $B = A - A_1$ which is proportional to the instantaneous amplitude of the signal A at point 29 with respect to the amplitude $A_1$ thereof when the slope of signal A changes from negative to positive. Temporarily omitting the function of the signal F applied to the And gate 38, the output of the And gate is high when the slope to the signal at point 29 is negative to provide from the slope quantizer 34 a high output E. The high input to switch 35 closes the switch to ground point 36. Therefore, the memory or capacitor 37 has one side thereof grounded and the other side at a potential equal to the instantaneous amplitude of the signal A at point 29. Thus, the signal stored in the memory, the charge across the capacitor 37, is equal to the signal A. Now, when the slope goes positive, the output of slope quantizer 34 is low to provide a low input to the switch whereby the latter is opened. From this time on, a variation in the potential at point 29 is manifested as a variation of like sense and magnitude at point 36 whereby it will be seen that the voltage at point 36 relative to ground will be equal to the difference between the instantaneous value of the signal A and the value $A_1$ thereof when its slope changed from negative to positive to open the switch. The value of the input at point 29, upon the stated change in slope, is measured, stored, and used to provide a potential at point 36 as the reference of value $A_1$. This reference value is in effect subtracted from subsequent instantaneous values of the input to produce a signal at point 36 proportional to the increment or decrement of the input (that is, proportional to the instantaneous value of the input relative to the reference). This incremental value B is illustrated in FIGS. 3b, 4b, and 5b.

The output I of the gain controller, the R.M.S. to direct-current converter 32, is fed to an amplitude quantizer 40 which, under the control of its gain input I, sets the high threshold level $I_1$ ($=K_1I$) and the low threshold level $I_2$ ($=K_2I$) illustrated in FIG. 3b. The amplitude quantizer 40 also receives as an input thereof the signal B from the capacitor 37 at point 36. This amplitude quantizer divides the signal amplitude at point 36 into three regions. When the potential at point 36 exceeds the potential $I_1$, the amplitude quantizer output C changes from high to low. The low output of the quantizer is equivalent to the signal $C_1$ of FIG. 1b. The output remains low until the voltage at B drops below the value $K_2I$ where $K_2$ is a fraction such as ⅓ of $K_1$. When B drops below $I_2$, the output C changes to high which is equivalent to the signal $C_2$ of FIG. 1b.

The output C (FIG. 3c) of the amplitude quantizer 40 is fed to a repetition rate lockout circuit 41 which has the function of eliminating high repetition rate pulse waveforms which occur at a frequency greater than the scanning frequency. Thus, the output of the repetition rate lockout 41 comprises a relatively long pulse D which is initiated at the negative going leading edge of pulse C of the amplitude quantizer 40 and which terminates after a period set by time constants within the repetition rate lockout circuit.

The width of a star signal pulse will vary according to several factors among which is the brightness of the star itself. For many applications, the output pulse of the detecting apparatus, which output pulse indicates the presence of a star, must be a rather sharp pulse. This is so particularly where the detector output is fed to a digital computer. Because of the variation of the star pulse itself, it is not feasible in such an application to utilize either trailing edge or leading edge to provide a sharp presence pulse. For this reason there is provided a centroid finder circuit 42 which produces an output pulse F (FIG. 3f) which is initiated upon the occurrence of the leading edge of pulse C and pulse D and which terminates an exactly predetermined interval after the centroid in time of the input thereto. The centroid finder is triggered by the leading edge of the output D of the repetition rate lockout 41 (which occurs simultaneously with the leading edge of the output C of the quantizer 40) and has as an additional input thereof the output C of the quantizer 40. For the specific application described herein it has been determined that the maximum star pulse width is less than $T_2$ milliseconds. Thus, the centroid finder circuit is arranged to produce its output pulse F so as to terminate at a time exactly $T_1$ milliseconds (where $T_1 = \frac{1}{2}T_2$) after the centroid in time of the input C thereto, it being understood that the input C has a duration indicative of the star pulse signal selected by the described apparatus.

The trailing edge of the centroid finder output F is sharpened by a differentiator 43 which feeds the differentiated signal to And gate 44. A second input to And gate 44 is derived from output C of quantizer 40 whereby the output G of the And gate 44 is high to indicate the presence of a star signal if the differentiated trailing edge of the centroid finder pulse occurs when the signal C is high, that is, if the signal C, indicative of the star pulse, has terminated when the delayed centroid finder output (its trailing edge) occurs, the And gate provides a high output.

An additional And gate 45 is arranged to provide a high output disable signal H (FIG. 3h) when its two inputs are high. The two inputs are derived from the output D of the repetition lockout 41 and the output F from the centroid finder 42. This disable output H may be utilized in any suitable manner such as, for example, to disable the input of a computer at which the presence pulse G is fed. Thus, even though the presence pulse G might otherwise be provided at the output of And gate 44, it is rejected under certain conditions wherein output H is high.

The And gate 45 and its output, the disable pulse H, yield information as to the state of the repetition rate lockout circuit 41. From an inspection of FIGS. 3, 4, and 5, it will be seen that the disable pulse H is high subsequent to the centroid finder F and for the entire duration of the repetition rate lockout output D subsequent to the centroid finder output F. Thus, the disable pulse H indicates the locked out condition of the system. This information may be required for certain aspects of operation of the star tracking system with which the pulse detector of this invention may be used. It is to be noted, however, that this And gate and its disable pulse H is not necessary for the operation of the pulse detector per se, and may therefore be entirely eliminated in some situations.

The operation of the embodiment of FIG. 2 will now be described in detail with reference to the waveforms of FIGS. 3, 4, and 5. The waveform A of FIG. 3a, as mentioned above, includes the star signal pulse 10 random noise caused by the phototube and random low frequency signals. This signal appears at point 29 of FIG. 2. When its slope is negative, the switch 35 is closed to ground point 36 whereby the voltage at point 36 is zero and the voltage (relative to ground) at point 29 is the charge across capacitor 37. At this point it may be noted that the output F of centroid finder 42 is high to permit the And gate 38 to provide a high output in response to the high output of the quantizer 34. When the signal at point 29 changes from negative to positive, the quantizer output E goes low to provide a low output from the And gate and open the switch to ground. This causes the voltage at point 36 to rise from zero by an amount equal to the rise in the voltage A subsequent to the opening of the switch.

If the voltage B continues to rise until it exceeds the voltage I, the output of amplitude quantizer 40 which is normally high changes from high to low as illustrated in FIGS. 3b and 3c. This negative going change triggers the repetition rate lockout 41 and causes its output D to change from low to high (FIG. 3d) triggering the centroid finder at this time (FIG. 3f). F is then low causing the switch to ground to remain open as long as F remains low whereby the voltage B at point 36 continues to follow the increment or decrement of the voltage at point 29.

Now if the voltage at point 29 drops below the level $I_2$ (=$K_2 I$ where $K_2$ is $\frac{1}{3}$ of $K_1$) within $T_2$ milliseconds after the centroid finder was triggered the voltage C will be high at the positive going trailing edge of the centroid finder output pulse F (FIGS. 3c and 3f). It is here noted, as will be more particularly explained hereinafter, that the centroid finder pulse F terminates at a time $T_1$ milliseconds after the centroid in time of the pulse C. By choice of circuits components $T_1$ is made equal to $\frac{1}{2}T_2$ where $T_2$ is the maximum width of pulse to be selected. Therefore, the maximum time interval between the leading edge of pulse C and the termination of the centroid finder pulse F is twice the time interval $T_1$, or $T_2$ milliseconds. To continue with the description, if C is high at the end of the centroid finder output pulse, both of the inputs to And gate 44 are high and this And gate will therefore pass the centroid finders differentiated trailing edge as a presence pulse G (FIG. 1g).

Referring now to FIG. 4, there is illustrated a waveform A of FIG. 4a wherein a long duration pulse waveform obliterates the star signal pulse. Under such conditions the voltage at point 36 will not drop below the value $I_2$ (FIG. 3b) within $T_2$ milliseconds after the centroid finder was triggered (FIG. 4b). Now the voltage C will be low at the end of the centroid finder output pulse F and the And gate 44 having one of its inputs low will not pass the centroid finders differentiated trailing edge as a presence pulse (FIG. 2g). It may be noted at this point that the signal B of FIG. 4b again goes to zero when the centroid finder output F is high (and the slope is negative) to operate switch 35 and ground point 36. Thus, a new reference level can now be established. An inspection of FIGS. 3b, 4b, and 5b will indicate that a new reference level, the grounding or zero value B, is repeatedly established.

Thus, it may be seen from inspection of FIG. 4 that a presence pulse will not be produced unless a selected chronological relation exists between the two selected amplitudes of the signal, that is, after exceeding the high threshold value the amplitude must drop below the low threshold value before the end of the predetermined time interval $T_2$ in order to produce a presence pulse.

Illustrated in FIG. 5a is still another component of the input waveform A. This is a high repetition rate pulse waveform such as those occurring during the passage of clouds or smoke through the field of view. These will obliterate the star signal pulse. In this case, the voltage B at point 36 will repeatedly rise above the high threshold value $I_1$ of FIG. 5b. The amplitude quantizer output C will repeatedly change from high to low. Now since the repetition rate lockout 41 is triggered by each negative going edge C and remains high for a selected cyclic period such as $T_3$ seconds (a period chosen for an exemplary scanning frequency) the repetition rate lockout 41 will then be repeatedly triggered before the end of its natural time period and thus continue to remain high as indicated in FIG. 5d. The period $T_3$ may be on the order of ten times $T_1$. The first positive going edge of the signal D from the repetition rate lockout will trigger the centroid finder, FIG. 5f, but since D remains high thereafter, subsequent rises of voltage B above the high reference value $I_1$ are blocked and additional triggering of the centroid finder is prevented. In this situation, no presence pulses can appear (FIG. 3g).

It is noted that in each of FIGS. 3h, 4h, and 5h the disable output H is high when its two inputs F from the centroid finder and D from the repetition rate lockout are high. In each of the three situations depicted in FIGS. 3, 4, and 5 the disable output H goes from low to high at the end of the centroid finder pulse F. It remains high until the $T_3$ second cyclic period terminates as in FIG. 3h or until the output of repetition rate lockout circuit goes from high to low (FIGS. 4h and 5h). Thus, it will be seen that even if a star signal pulse should appear when the direct-current disable signal H is high, a presence pulse G will not appear. The direct-current disable signal H is effective in response to fluctuations in phototube current.

Illustrated in FIGS. 6 and 7 are the details of an exemplary circuit of the detector shown in block form in FIG. 2. The input signal from the phototube or phototube amplifier appears at input terminal 50 and is fed to the R.M.S. to direct-current converter 32 which fundamentally comprises a high pass filter and amplifier, a rectifier, and a ripple filter. The high pass filter is formed by the converter input capacitor 51, together with the base input resistance of amplifying transistor 52 in parallel with resistor 53. The transistor 52 provides for amplification of the input signal. Via capacitor 54 the amplified and filtered signal is fed to a rectifier 55 and thence to a ripple filter comprising resistor 56 and capacitor 57. The output of the ripple filter is fed to cathode follower 58 at the cathode of which appears the direct-current reference voltage proportional to the R.M.S. value of Gaussian noise. This output signal on lead 59 is fed to the input of the amplitude quantizer 40 (FIGS. 2 and 7). Potentiometer 61, connected between ground and the emitter of transistor 52, provides for adjustment of the transistor gain. Potentiometer 62, connected between ground and the anode of diode 55, provides for adjustment of the direct-current level of the converter output.

After passing filter 31 the input signal is fed to the memory or storage capacitor 37 as described in connection with FIG. 2, and also fed to the slope quantizer 34 as shown in FIG. 6. The slope quantizer is basically an amplifying transistor combined with a differentiator. A transistor 63 is connected in conventional fashion as an amplifier and is biased to be normally conducting by collector-to-base feedback resistor 64. The differentiating action is provided by capacitor 65, together with the relatively low base-to-emitter impedance of transistor 63. The input signal appearing at point 29 is coupled to one side of the differentiating capacitor 65 whereby if the signal at point 29 is of negative slope, a negative going current is provided across the capacitor and through the base to emitter thereof to reduce the base-to-emitter current normally produced by the feedback resistor 64. With decreasing base current, the transistor conducts less and its collector output at point 66 increases. Similarly with a positive going waveform at point 29, an increase of base current is produced to cause the transistor to conduct more heavily and diminish the potential at point 66. The output signal at the collector of the transistor is fed through coupling capacitor 67 across resistor 68 as one input to the And gate 38.

The And gate 38 comprises a diode 70 which receives at its cathode the output of slope quantizer 34 and has its anode connected through resistor 71 to lead 72 from the output of the centroid finder 42 (see FIG. 7). The And gate 38 has an output terminal 73 connected to switch 35.

In order to overcome leakage of the output capacitor 67 of slope quantizer 34, the circuit is arranged to provide a small current from a source of negative potential through resistor 68 through diode 70 and resistor 71 and via the lead 72 to the high potential at the centroid finder output. This relatively small current is caused to provide a normally high output from the slope quantizer 34 in the absence of the signal to be differentiated by the quantizer. A negative going slope causes this output to increase while positive going slope diminishes this current.

The switch to ground 35 comprises a transistor 76 which is normally cut off by the absence of a forward base-to-emitter bias. Upon occurrence of a high signal from the output 73 of And gate 38, diode 77 connected to the base of transistor 76 causes the latter to conduct and thus maintain point 36 at the collector of the transistor at a fixed potential. While a fixed potential has been previously referred to ground, it is, in the described circuit, a relatively small amount above ground due to the fixed voltage drop across the forward biased diode 78, 79, and 80 and the conducting transistor 76. The transistor conducts from point 36 through resistor 81 to a source of negative potential. Thus, in the absence of a high signal at the output of And gate 38, the switch is open, while a high signal from the And gate closes the switch to provide a fixed reference level at point 36 whenever the slope of the input signal is negative.

The signal B appearing at point 36 is fed via cathode follower 82 (which may be identical to cathode follower 58 of converter 32) and lead 83 to amplitude quantizer 40 of FIG. 7. The amplitude quantizer 40 is functionally illustrated in FIG. 8. This device may be compared in operation to a monostable multivibrator wherein, as is well known, a pair of bistable devices, or switches, are connected to have mutually exclusive states. The states of the switches of the monostable multivibrator are controlled in accordance with an RC time constant of the device. In the amplitude quantizer a voltage level control takes the place of the timing control whereby the devices are switched upon the occurrence of selected voltage levels. A first switching device 84, which may be an electronic switch, has a pair of biasing electrodes for receiving on leads 83 and 69, a pair of biasing potentials which will establish conduction or nonconduction of the switch 84 in accordance with the relative value of the two bias potentials. The potential on lead 83 is made directly proportional to one of the two input signals such as input signal B. The bias potential on lead 69 is also made directly proportional to the other of the input signals such as signal I, but the relation between the bias potential established on lead 69 and the magnitude of the second input I is controlled by means of a voltage divider which includes resistors 93 and 92. Additionally, a steady bias is supplied via the voltage divider from a source 58a. The relation between the bias potential established by the input signal I and the input signal itself is controlled by controlling the potential at point 95 which comprises one end of the voltage divider. The potential at point 95 is controlled by a second switch 85 which, when closed, will establish at point 95 a potential which is ground or a relatively small amount above ground. When switch 85 is open, as illustrated, the potential at point 95 is higher, as established by a potential source 85a. Normally open switch 85 is closed upon change in state of the electronic switch 85 (as from closed to open).

In operation, switch 85 is normally open and switch 84 closed. As the two input signals B and I vary so that the respective bias potentials established thereby on leads 83 and 69 attain a relative value such that the potential at 83 is greater than the potential at 69, switch 84 is opened. Upon opening of switch 84, switch 85 is closed to lower the potential at the voltage divider terminal 95 by shunting source 85a. With switch 85 closed, the relation between the potential at 69 and the input I is changed. For example, with switch 85 open, the bias potential at 69 may be equal to $K_3I$ whereas with the switch 85 closed, the bias potential at point 69 is equal to $K_4I$. $K_3$ and $K_4$ are constants and have some preselected relation such as, for example, $K_4 = \frac{1}{3} K_3$. Thus, when the input B goes above the input I, switch 84 is opened and held open until the input B drops below $$\frac{I}{3}$$

When the input B drops below $$\frac{I}{3}$$

switch 84 is closed and thus causes switch 85 to open. Note that this operation will take place whether one or both of B and I are varying in magnitude.

The two inputs to the amplitude quantizer are fed to the base and emitter of normally conducting transistor or electronic switch 84 through resistor 93 and diode 86 respectively (FIG. 7). Thus, the signal B appears on lead 83 and signal I on lead 59. Signal I includes a D.-C. level (equivalent to source 58a of FIG. 8) caused by the conduction of cathode follower 58 of converter 32 (FIG. 6). Transistor 84 is normally conducting largely by means of positive potential applied to its base via resistor 87. Its collector at point 88 is low whereby zener diode 89 is cut off. Transistor or switch 85 has the same potential on its base and emitter when zener diode 89 is cut off by virture of the base-to-emitter connecting resistor 90. When the voltage B on input lead 83 rises sufficiently relative to the voltage I on input lead 59, transistor 84 comes out of saturation. As it does, its collector potential rises to cause the zener diode 89 to conduct, making the base of transistor 85 more positive. As transistor 85 starts to conduct, its collector potential drops and a negative current flows through resistor 91 and resistor 92 to the base of transistor 84, providing a positive feedback whereby switching action occurs to effect cut off of transistor 84 and conduction of transistor 85.

Conduction of transistor 85 drops the value of the reference signal I as seen by the base of transistor 84 by a factor such as ⅓. This action is due to the fact that low potential at the collector of transistor 85 forward biases diode 94 and thus substantially grounds point 95. A voltage divider formed by resistor 93 and resistor 92 in parallel with resistor 87 thus establishes the bias voltage at the base of transistor at ⅓ of the value of the voltage on lead 59.

Now, should the voltage on input 83 (which controls the emitter bias) drop sufficiently relatively to the now diminished base potential of transistor 84 (or should I or both B vary sufficiently), the latter begins to conduct. Switching action again occurs to maintain transistor 84 in saturation and transistor 85 cut off. Thus, there is produced at the amplitude quantizer output, the collector of transistor 85, the negative pulse C which is fed to the repetition rate lockout circuit 41.

Repetition rate lockout circuit 41 (FIG. 7) is a monostable circuit including a transistor 100 which is normally conducting by virtue of the base current supplied by a positive source of potential through potentiometer 101, resistor 102 and diode 103 to provide a normally low output at its collector. A negative pulse C from the amplitude quantizer is fed through diode 104 to effect cut off of diode 103 and therefore to cut off transistor 100 whereby its collector output potential goes high. The negative input signal through diode 104 is stored as a negative charge increment on a relatively large capacitor 105 which starts to discharge this negative charge increment upon termination of the negative pulse C. The negative charge increment on the capacitor 105 is discharged through resistor 106, resistor 102 and potentiometer 101 to the positive potential source. The values of the resistance in the discharge path and the value of the capacitor 105 are chosen such that after a period $T_3$ (which is chosen as the period of the scanning frequency) the charge on the capacitor has dropped to a value sufficient to allow diode 103 to again conduct whereby transistor 100 again conducts and its output goes low. Transistor 100 cannot return to conduction after the termination of the negative pulse from the amplitude quantizer before the end of the period set by the discharge time of the capacitor 105. However, if the input via diode 104 should again go low before the capacitor charge increment has been completely discharged, the capacitor is again charged and a new period $T_3$ is initiated upon termination of this second negative input pulse. Thus, as indicated in FIG. 5d, the output D of the repetition rate lockout circuit will remain high in the presence of a plurality of negative pulses C which are spaced apart a period less than the period $T_3$. The output D of the repetitionn rate lockout at the collector of transistor 100 is fed as one input to the disable And gate 45 and as an input to the centroid finder circuit 42 via leads 107 and 108.

The centroid finder 42 is a modified one shot or monostable multi-vibrator which is triggered by the positive going leading edge of the repetition rate lockout signal D. Fundamentally the modification of conventional multivibrator circuit action comprises means for providing a variable timing circuit and means for operating this circuit for the duration of the input pulse. The input pulse is the negative going pulse C on lead 109 from the amplitude quantizer. The centroid finder provides a positive going signal at a predetermined time interval $T_1$ after the occurrence of the center in time or centroid of the input pulse C. If the input pulse is low, the output pulse of the centroid finder is the selected time interval $T_2 (=2T_1)$. If the input on lead 109 is high, the time constant of the multivibrator is halved so that the output pulse has a duration $T_1$ which is equal to $$\frac{T_2}{2}$$

It can be shown mathematically that if the input on lead 109 becomes low when the device is triggered from its stable state and if the input changes from low to high before the output pulse terminates, the output pulse will terminate at a time exactly $T_1$ milliseconds after the centroid of the low input.

The centroid finder comprises a transistor 120 which is normally conducting by reason of the base current supplied from a positive source of potential through potentiometer 121, resistor 122, and diode 123 to the transistor base. Its collector is low and therefore the base of the second transistor 124 of the centroid finder is kept low by virtue of the usual parallel resistance-capacitance collector-to-base coupling network 125. Thus, the collector of transistor 124 is high to back bias diode 126 and provide a high potential at point 127 which comprises the output of the centroid finder circuit. A positive going trigger from the repetition rate lockout 41 applied through leads 107 and 108 via capacitor 128 to the base of transistor 124 causes multivibrator switching action to occur to place transistor 124 in saturation and cut off transistor 120 whereby the output at point 127 goes low. The switching from stable to unstable state is expedited by the coupling of a negative going signal from the collector of transistor 124 via diode 129, timing capacitor 140, auxiliary input switch 141 and diode 123 to the base of transistor 120.

Timing capacitor 140 is provided with two possible discharge paths, both of which include the variable resistance 121. One of these discharge paths includes resistor 122 while the other includes both resistor 122 and resistor 142 which is connected in parallel therewith by means of switching diode 143. If diode 143 is forward biased and conducts both of resistors 142 and 122, which are of equal value, will be in the discharge path of the timing capacitor 140. If switching diode 143 is biased to cut off, resistor 142 is eliminated from the discharge path and the time constant is substantially doubled (since to equal resistors in parallel provide one-half the resistance of either alone and resistor 121 is relatively small).

The negative input pulse C on lead 109 is applied via diode 144 to control the diode switch 143. When input C is high, diode 144 is back biased and switching diode 143 conducts. When input C is low, diode 144 conducts to back bias switching diode 143 and resistor 142 is eliminated from the discharge path of the timing capacitor 140. Thus, it will be seen that the input C becomes low when the circuit is triggered by the positive going signal on lead 108 and changes from low to high before the output pulse from the centroid finder at 127 terminates. This change of the input C before termination of the output F will take place whenever the input pulse duration is less than the greater ($T_2$) of the two possible periods of the centroid finder circuit. This greater of the two periods $T_2$ is chosen as being slightly greater than the predetermined duration of a typical star pulse. The period $T_2$ has been predetermined by observation of the typical star pulse produced by the optical system. If the input C remains low for a time greater than $T_2$, the centroid finder pulse F terminates at the end of the period $T_2$ and, therefore, the output F will be high when the amplitude quantizer output C (the input to the centroid finder) is low. Since these two signals C and F comprise the two inputs to the output And gate 44, if F is high while C is low no output pulse is provided from the And gate.

It will be observed that by choosing the maximum unstable period $T_2$ of the centroid finder to be slightly greater than the maximum duration of a typical star pulse the centroid finder actually performs two functions. The first function is, of course, that of producing an output signal (the positive going trailing edge of pulse F) at a time which occurs after an interval $T_1$ subsequent to the centroid of pulse C. The second function of the centroid finder circuit is to prevent the existence of a presence pulse if the pulse C has a duration greater than a preselected time $T_2$. In other words, the centroid finder circuit, together with the And gate 44, comprises timing and logic for producing a signal indicating the chronological relation between the leading edge of pulse C (when the amplitude of signal A is above a selected value) and the trailing edge of pulse C (when the amplitude of input signal A is below a selected value). Thus, the centroid finder not only indicates the center of the star pulse, but also selects pulses of less than a selected or predetermined width.

The centroid finder output pulse F is fed via lead 72 to the And gate 38 of FIG. 6 as previously described and is also fed through capacitor 150 and across resistor 151 as one input to the And gate 44. Capacitor 150 and resistor 151 differentiate the positive going trailing edge of pulse F. The pulse F, as previously described, is also fed by lead 152 as the second input to the And gate 45 which produces the disable pulse H.

As previously described in connection with FIG. 1b, the time comparison and logical circuit 124 may have an auxiliary input 125. The illustrated centroid finder circuit (FIG. 7) includes such an auxiliary input which operates to effect variation of the maximum period of the pulse which is selected by the centroid finder and And gate 44. As previously described, the maximum period $T_2$ is substantially determined by the time constant of timing capacitor 140 and resistor 122 (with the resistor 142 eliminated from the discharge path). This time constant $T_2$ and also the time constant $T_1$, the halved time constant, may be selectively increased or decreased by the operation of the auxiliary input switch 141 to substitute for capacitor 140 in the timing circuit of the multivibrator other capacitors such as 153 or 154. Capacitors 153 and 154, for example, may be larger and smaller respectively than capacitor 140, whereby with capacitor 153 in the timing circuit both intervals $T_1$ and $T_2$ are increased while these intervals are decreased when capacitor 154 is switched into the timing circuit. The operation of the three-position switch 141 may be effected manually or automatically as deemed necessary or desirable in order to change the predetermined time relation which the information signal must match.

It will be seen that a novel and improved pulse detector system is provided for matching the amplitude time pattern of an input signal with a predetermined amplitude time pattern. The operation of the system is enhanced and its mechanization considerably simplified by the provision of a number of novel circuit arrangements for achieving logical time comparison, amplitude comparison and selection of reference levels for amplitude measurement.

While for purposes of exposition the exemplary mechanization of the principles of the present invention has been described as applied to an optical system, it will be readily appreciated that the invention is of broad application and may equally well be used for the detection of waveforms in many other information gathering systems. Thus, the detection of intelligence in the presence of noise may be considerably enhanced in a variety of apparatus.

There have been described a novel circuit and techniques which detect a specific time dependent pulse waveform and reject all others. The technique comprises the indication of first and second relations (such as greater than $I_1$ and less than $I_2$) between an input signal and a reference signal. The time duration of each of these amplitude relations is measured relative to itself or relative to another such relation. If these times match a particular sequence, or occur in a selected chronological relation, the presence of the desired waveform is manifested. The particularly described mechanization of the inventive concept in effect measures the amplitude of the leading edge of the pulse and the trailing edge of the pulse. If the trailing edge drops below a selected value within a predetermined time interval, a desired pulse exists. Further, if additional leading edges occur too frequently, one after the other, the specified pulse does not exist. A centroid finder is utilized to provide a sharp pulse fixedly related in time to the midpoint in time of the star pulse. Thus, the average time delay between the star pulse and the presence pulse is more nearly constant.

Although the invention has been described and illustrated in detail, it is to be clearly understood that the same is by way of illustration and example only and is not to be taken by way of limitation, the spirit and scope of this invention being limited only by the terms of the appended claims.

I claim:
1. Detecting apparatus comprising an input channel for receiving an input signal containing a waveform to be detected, a source of reference signal, amplitude detecting means responsive to said input and reference signals for providing first and second signals respectively indicative of first and second relations between said input and reference signals, and timing means responsive to said detecting means for generating an output signal indicative of a selected chronological relation and time interval between said first and second signals.

2. Detecting apparatus comprising an input channel for receiving an input signal, means responsive to said input channel for generating a reference signal having an amplitude in accordance with the amplitude of said input signal when the time derivative thereof is a predetermined value, first and second amplitude detecting means responsive to said input and reference signals for providing first and second signals respectively indicative of first and second relations between said input and reference signals, and timing means responsive to said first and second detecting means for generating an output signal indicative of a selected chronological relation between said first and second signals.

3. Apparatus of claim 2 wherein one of the relations between said input and reference signals comprises a difference in amplitude substantially proportional to the noise level of said input signal.

4. A pulse detector comprising an input channel for receiving a signal which includes a pulse to be detected, a capacitor having one side thereof coupled with said input channel, a switch selectively coupling the other side of said capacitor to a point of fixed potential, a differentiator connected between said input channel and said switch for operating said switch, a noise level-to-direct-current converter having an input from said input channel, an amplitude detector having an input from said other side of said capacitor and a reference input from said converter, first and second monostable devices each having an input from said amplitude detector, said second monostable device having a trigger input from said first monostable device, and an And gate having inputs from said amplitude detector and from said second monostable device.

5. A pulse detector comprising an input channel for receiving a signal which includes a pulse to be detected, a capacitor having one side thereof coupled with said input channel, a switch selectively coupling the other side of said capacitor to a point of fixed potential, a differentiator connected between said input channel and said switch for operating said switch, a noise level-to-direct-current converter having an input from said input channel, an amplitude quantizer having an input from said other side of said capacitor and a reference input from said converter, said quantizer comprising means for providing first and second output signal levels respectively representative of first and second relations between said reference input and said input from said capacitor, first and second monostable devices each having an input from said amplitude quantizer, said second monostable device having a trigger input from said first monostable device, and an And gate having inputs from said amplitude quantizer and from said second monostable device.

6. A pulse shape correlator for detecting the presence of a specified pulse in an input signal, comprising reference means for generating a reference signal, means for measuring the amplitude of said input signal relative to the amplitude of a selected portion thereof, comparison means for providing signals representative of first and second points of time at which said measured amplitude has respectively first and second relations to said reference signal, means for establishing a reference time interval, and means for comparing said interval with the interval between said points of time.

7. A pulse shape correlator for detecting the presence of a specified pulse in an input signal comprising reference means for generating a reference signal bearing a predetermined relation to said input signal, means for measuring the amplitude of said input signal relative to the amplitude of a selected portion thereof, gain control means for establishing first and second threshold amplitudes each bearing a predetermined relation to said input signal, comparison means for providing signals representative of first and second points of time at which said measured amplitude is greater and lesser, respectively, than said first and second threshold amplitudes, means for establishing a reference time interval, and means for comparing said interval with the interval between said points of time.

8. Detecting apparatus comprising an input channel for receiving an input signal containing a waveform to be detected, a source of reference signal, having an amplitude dependent upon a predetermined characteristic of said input signal, amplitude detecting means responsive to said input and reference signals for providing first and second signals respectively indicative of first and second relations between said input and reference signals, and timing means responsive to said detecting means for generating an output signal indicative of a selected chronological relation between said first and second signals.

9. Detecting apparatus comprising an input channel for receiving an input signal containing a waveform to be detected, a source of reference signal, amplitude detecting means responsive to said input and reference signals for providing first and second signals respectively indicative of first and second relations between said input and reference signals, one of the relations between said input and reference signals being a predetermined function of said input signal, and timing means responsive to said detecting means for generating an output signal indicative of a selected chronological relation between said first and second signals.

10. Detecting apparatus comprising an input channel for receiving an input signal containing a waveform to be detected, a source of reference signal, amplitude detecting means responsive to said input and reference signals for providing first and second signals respectively indicative of first and second relations between said input and reference signals, timing means responsive to said detecting means for generating an output signal indicative of a selected chronological relation between said first and second signals, means for detecting the centroid of one of said first and second signals, and means responsive to said centroid detecting means and said timing means for producing a centroid output signal.

11. Detecting apparatus comprising:
an input channel for receiving an input signal to be detected;
means for detecting a predetermined amplitude variation of said signal between a first threshold level and a second threshold level;
means for establishing said first and second threshold levels at values proportional to noise in said input signal;
means for measuring the duration of said predetermined amplitude variation of said input signal; and
means for comparing said duration with a selected time interval.

References Cited in the file of this patent
UNITED STATES PATENTS

| | | |
|---|---|---|
| 2,273,934 | Campbell | Feb. 24, 1942 |
| 2,275,930 | Torcheux | Mar. 10, 1942 |
| 2,489,297 | Labin et al. | Nov. 29, 1949 |
| 2,561,772 | Atwood | July 24, 1951 |
| 2,885,547 | Taggart | May 5, 1959 |
| 2,898,526 | Trousdale | Aug. 4, 1959 |
| 2,964,655 | Mann | Dec. 13, 1960 |
| 3,003,069 | Clapper | Oct. 3, 1961 |